April 17, 1934.  W. G. EXTON  1,954,925
PHOTO-ELECTRIC MEASURING APPARATUS
Filed Aug. 12, 1931
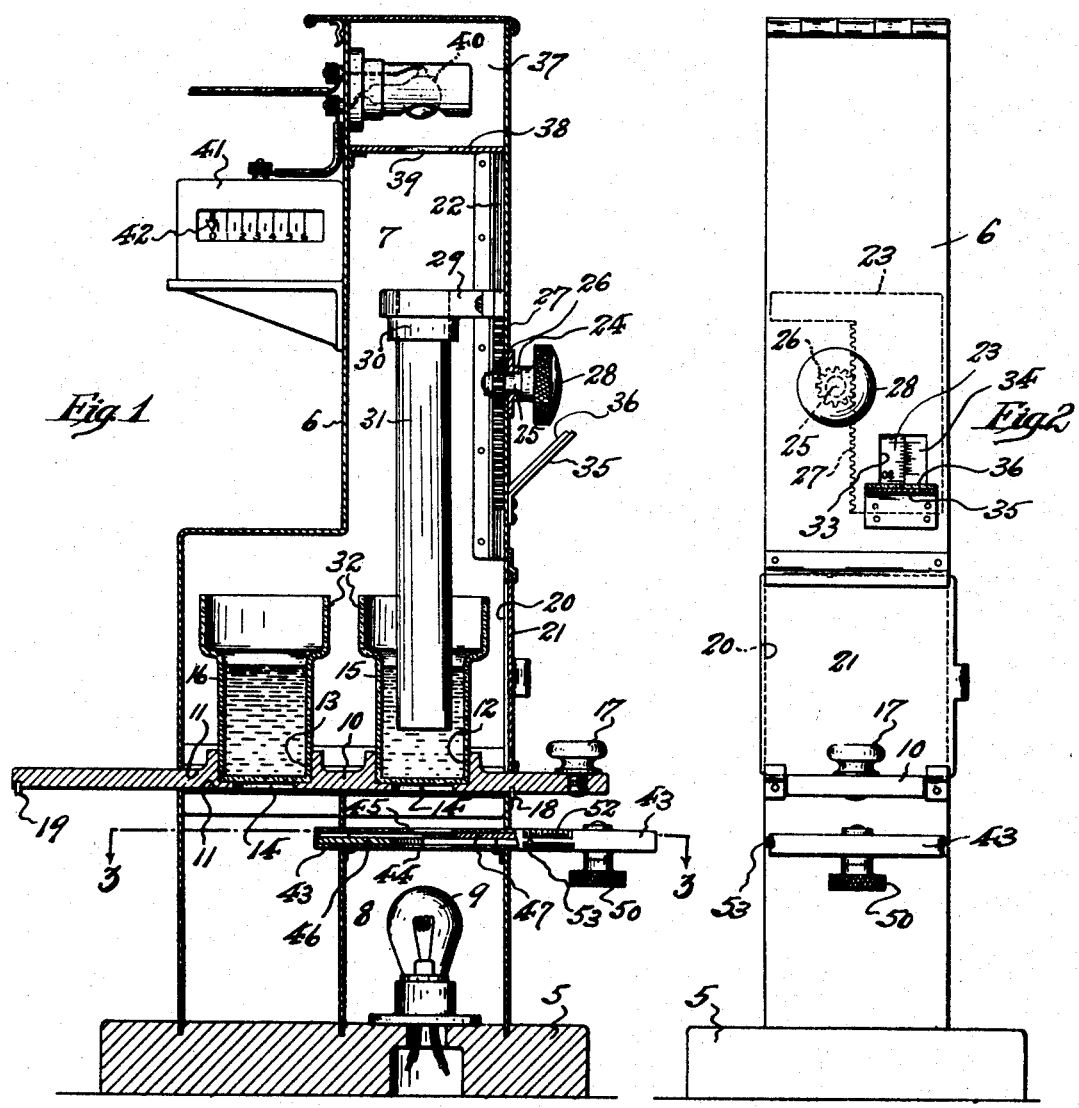
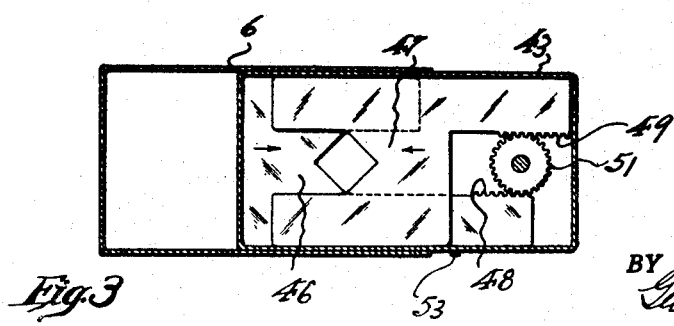
INVENTOR
William G. Exton,
BY George D. Richards
ATTORNEY Patented Apr. 17, 1934

1,954,925

UNITED STATES PATENT OFFICE 1,954,925

PHOTO-ELECTRIC MEASURING APPARATUS

William G. Exton, New York, N. Y.

Application August 12, 1931, Serial No. 556,579

3 Claims. (Cl. 88—14)

This invention relates, generally, to a novel photo-electrical apparatus for measuring turbidities, colors and other characteristics of fluids.

It has long been customary to measure the concentrations of colored or dispersed materials by visually comparing the brightness of light coming from a common source as it is transmitted through the unknown sample or specimen and through a comparison standard composed of similar material of known value or concentration, and devices for applying such comparative methods visually have long been well known under names such as Nesslar tubes or the Duboscq colorimeter. Many instruments have been in use for years which measure such differences in light transmission on scales which denote the relative depths at which the unknown sample or specimen and the comparison standard are brought to a brightness match. When brought to such brightness match, the concentration of the unknown sample or specimen is easily derived from the scale readings denoting depths and the known value of the standard by some usually simple mathematical calculation as that expressed, e. g., by Beer's law.

My present invention has for an object to provide a novel apparatus adapted to increase the accuracy and simplicity and otherwise improve the facilities for such measurements, as have heretofore been made visually, by substituting for the limitations of known vision and the personal equations of observers, a photo-electrical means to accurately indicate the degree of transmitted light under the conditions of test, whereby a brightness match or balance of light is obtainable.

Since it also happens, however, that it is sometimes necessary to measure substances which cannot be measured by the direct comparison method as above indicated, because materials for preparing proper comparison standards are, for one reason or another, unavailable; it is, therefore, a further object of this invention to provide an apparatus including not only means to enable the necessary preliminary balancing of light before making measurements as above indicated, but which further includes novel means for obtaining light indicated measurement criteria even when suitable comparison standards are not available for direct comparison, thus enabling the making of measurements of all kinds of materials.

The apparatus of the present invention thus makes it possible and convenient to measure many substances of great interest which cannot now be measured by the usual comparison of the unknown sample or specimen with a known standard of similar material because of peculiarities of the material to be measured which make impracticable the preparation of suitable comparison standards. As instances of such substances, mention may be made of hemoglobin on account of its changeableness in oxygen content, and of various proteins on account of their tendencies to denature and peptize, as well as of substances like indican which are unavailable because of prohibitive expense involved in their synthetic preparation.

Other objects of this invention, not at this time more particularly enumerated, will be understood from the following detailed description of the invention.

An illustrative embodiment of this invention is shown in the accompanying drawing, in which:—

Fig 1 is a vertical longitudinal sectional view of a photo-electric measuring apparatus made according to and embodying the principles of this invention; Fig. 2 is a side elevation of the same looking toward the left in Fig. 1; and Fig. 3 is a fragmentary horizontal section, taken on line 3—3 in Fig. 1.

Similar characters of reference are employed in the above described views, to indicate corresponding parts.

Referring to said drawing, the reference character 5 indicates a base upon which is mounted a casing 6 providing an interior enclosed chamber 7. Arranged within the lower end of said casing 6 is a light compartment 8 within which is mounted a source of light, such e. g. as the incandescent electric lamp 9, the light emanating therefrom passing vertically upward through the main body of the chamber 7 of said casing 6. Arranged to be disposed in transverse horizontal position across the chamber 7 is means to hold the fluids or substances to be examined. This means is subject to more or less variation as to form, but preferably comprises a slidable supporting plate 10 movable in channeled guideways 11. Provided on the upper side of said supporting plate 10 are spaced seating depressions or sockets 12 and 13. Axially aligned with each seating depression or socket 12 and 13, and formed in the supporting plate body 10 are apertures 14. Respectively receivable in said seating depressions or sockets 12 and 13, are fluid holding cups 15 and 16. These cups are preferably made of glass, at least the bottom ends of which are transparent. The lower ends of said cups, when entered in the seating depressions or sockets 12 and 13, will serve to support the cups vertically upright upon the supporting plate 10, with their transparent bottoms registered over the apertures 14. By sliding the supporting plate 10 in desired direction, either one or the other of the cups may be aligned with and in the path of light emanating from the light source provided by the lamp 9. Such arrangement is of great convenience when utilizing the apparatus to measure an unknown sample or specimen of a given substance in comparison with a known standard of such substance, since after measuring the known standard to obtain its scale reading, the unknown sample or specimen may be quickly substituted in the path of light for the comparison standard, by sliding the supporting plate 10 in its guide. To facilitate such manipulation an externally projecting end of said supporting plate 10 is provided with a finger-piece 17, and stops 18 and 19 are also provided in connection with said supporting plate to respectively limit the movement of the latter in opposite direction, and to assure the desired selective alignment of the cups 15 and 16 in the path of light. A wall of the casing 6 is provided with an entrance way or opening 20 above the supporting plate normally closed by a door or cover plate 21, opening of the latter giving access to the supporting plate sockets for the insertion or removal of the cups therefrom, and also facilitating the selective shifting of the cups relative to the light path preparatory to examinations of the content thereof.

Arranged within said casing 6, along one side of the main interior chamber 7 thereof, for vertical up and down movement in guideways 22, is a combined rack-plate and scale-member 23. Journaled in a suitable bearing element 24, mounted in the adjacent wall of the casing 6, is a spindle 25 upon the inner end of which is fixed a pinion 26 which meshes with the teeth 27 of said rack-plate. Fixed on the exterior end of said spindle 25 is a knob 28 for rotating the spindle and pinion to raise or lower said rack-plate as may be required. Secured to the upper end of said rack-plate is laterally projecting bracket member 29 having a vertically disposed retaining bushing 30 in which is secured an end of an optical plunger 31, whereby the latter depends vertically from said bracket member 29, being carried by the latter so as to be movable up or down in company with corresponding movements of said rack-plate. The lower free end of said optical plunger 31 extends downwardly so as to be capable of being entered into the particular fluid cup which is aligned in the path of light emanating from the lamp 9. Preferably the upper end of each fluid cup is an annularly enlarged portion 32 which provides a basin to receive the overflow of fluid driven upwardly from the main body of the cup by a descending movement of the optical plunger. By raising or lowering the optical plunger within the fluid cup aligned therewith, the depth of the column of fluid intermediate the lower end of said plunger and the bottom of the cup may be increased or decreased at will. Suitably inscribed on the outer side of said combined rack-plate and scale member is a scale, preferably reading in millimeters. The wall of said casing 6 adjacent to the scale member thus provided is cut away to provide an opening 33 through which the scale is exposed. Fixed at one side of said opening is a vernier scale-plate 34 in conjunction with which the movable scale member may be read. Supported by a bracket 35, for angular outward projection relative to said opening 33 and the scale markings visible therethrough, is a reflector mirror 36 upon which is reflected the scale reading, so that the same may be more conveniently observed by the operator of the apparatus.

Formed in the upper end of the casing chamber 7, above the optical plunger 31, is a compartment 37, preferably bounded on its lower side by a partition 38 having an aperture 39 aligned with the optical plunger in the path of light emanating from the light source provided by the lamp 9. Mounted within this compartment 37, for exposure to light entering upwardly through said aperture 39, is a photo-electric cell 40 of any well known form, upon the anode of which is impressed positive voltage to attract and give direction to the electrons leaving the light sensitive cathode thereof, the latter being subject to excitation by light emanating from the lamp 9. Said photo-electric cell 40 is suitably connected electrically with a suitable form of meter responsive to the electrical output of the cell, such e. g. as a milliammeter 41, having a scale over which moves the electrically responsive indicator element 42.

Mounted above the light source provided by the lamp 9 is a manipulatable light modifying means or diaphragm having an aperture which can be increased or decreased at will, with a readable scale to indicate the degree of light modification obtained. This light modifying means is also subject to wide variation as to its mechanical form. Illustrative of one practical form of such light modifying means I have shown the same to comprise a housing 43 having aligned openings 44 and 45 in its top and bottom walls, which are in turn aligned in and with the path of light emanating from the lamp 9 to pass upwardly through the interposed fluid cup and its content and through the optical plunger to the photo-electric cell. Slidable in opposite directions between the top and bottom walls of said housing 43, and mutually in relation one to the other, are a pair of shutter plates 46 and 47 having opposed V-shaped open ends for movement across the path of light. One said shutter plate, as 46, is provided with a toothed rack portion 48 and the other said shutter plate, as 47, is likewise provided with an opposed tooth rack portion 49. One end of the housing 43 projects exteriorly from the casing 6, and journaled in a wall thereof is a knob 50 to the inner end of which is fixed an actuating gear 51, with opposite sides of which the respective toothed rack portions mesh. As the V-shaped ends of the shutter plates are moved toward one another, the light transmitting aperture formed thereby is diminished, vice versa, as they are moved apart such light transmitting aperture is increased. The degree of movement of the shutters is correlative to the degree of transmitted light modification; and to give visual indication thereof a suitably calibrated scale 52 is provided in connection with an external portion of the housing 43, over which moves an indicator member 53 which receives its motion from and in correspondence to the motion of the shutters.

When utilizing the apparatus to obtain measurement criteria pursuant to a method corresponding to the direct comparison of an unknown sample or specimen of the substance desired to be examined with a known standard of like substance, the shutter plates 46—47 of the light modifying means are preferably opened to provide a light transmitting aperture of maximum area. The comparison standard is then placed in one of the cups, as 15, and the unknown sample or specimen is placed in the other of the cups, as 16; said cups being mounted on the supporting plate 10. Said supporting plate 10 is then positioned to dispose the cup 15 containing the known standard in and in alignment with the path of light, whereupon the optical plunger 31 is lowered to a selected depth, indication of which is noted. The light thereupon transmitted through the selected depth of the comparison standard will react upon the photo-electric cell 40, whereupon its output of electrical energy will be indicated upon the milliammeter 41 a reading of the scale of which is taken. After this procedure, the supporting plate 10 is manipulated to substitute in the path of light the cup 16 containing the unknown sample or specimen for the cup containing the comparison standard, whereupon the optical plunger 31 is lowered to produce a depth of said unknown sample or specimen which will transmit that amount of light which will react upon the photo-electric cell 40 to the degree sufficient to produce the same scale indication on the milliammeter 41 as was produced by the light transmitted through the selected depth of the comparison standard, at which point the depth scale is read. The difference in depths gives the concentration of the unknown when treated mathematically by some such equation as provided by Beer's law.

When it is desired to examine a substance for which a comparison standard is difficult to obtain or prepare, the following method may be pursued. Presupposing that a calibration has previously been obtained based upon measurement by the apparatus of a specimen of the substance in question the value of which is known, thereafter other samples or specimens of this substance, the value of which are unknown, may be measured by the apparatus to obtain value indicating data to be referred to the prepared standard or comparison calibration. To obtain the standard or comparison calibration, the specimen of known value is measured as follows:

The shutters of the light modifying device are first set to form an aperture of selected area intermediate minimum and maximum size limits, whereupon distilled water or other suitable stable fluid is placed in one of the cups, and the optical plunger set to produce a selected depth thereof. The light transmitted through the distilled water will react upon the photo-electric cell and will produce an indication on the milliammeter scale which is noted, say, for example, an indication of 2 degrees. The distilled water or other blank is removed and a specimen of the given substance of known value is placed in a cup and the optical plunger set to the same depth as used for the distilled water, the shutter of the light modifying device remaining in the position selected when setting the apparatus by use of the distilled water as above described. Now the shutter of the light modifying device is manipulated to increase or decrease the aperture formed thereby and thus increase or decrease the amount of light passing through the specimen to the photo-electric cell as may be required until the milliammeter indication corresponds to that obtained with the distilled water, whereupon the difference in size of aperture gives the data corresponding to the known value of the concentration from which may be suitably calculated the calibration thereafter to be referred to when measuring substances of like character but of unknown value.

Assuming that at some subsequent time it is desired to measure a sample of the given substance of unknown value. The apparatus is preferably first checked by utilizing a blank of distilled water, with the shutter setting and depth plunger setting in the original selected positions to obtain a reading of the milliammeter scale, which might vary slightly from the 2 degrees originally indicated, if there is any variation in intensity of light emanating from the light source at the time, in which case the thus varied reading of milliammeter scale will be taken as indicating the measurement point. After thus checking the apparatus, the specimen or sample of unknown value is introduced into the light path, whereupon the shutter of the light modifying device is adjusted until the indicated milliammeter scale reading is produced, at which point the aperture scale is read, such aperture scale reading being referred to the previously obtained calibration derived from the original measurement of the substance of known value for calculation of the value of the unknown sample or specimen.

It will be understood that many variations of the above generally described methods of using the apparatus will commend themselves to the user thereof, consequently the methods above mentioned are described largely by way of illustration.

It will also be understood that many changes could be made in the construction of the apparatus itself and many widely different embodiments of the invention could be made without departing from the spirit or scope thereof, and consequently it is intended that all matter contained in the above description or shown in the accompanying drawing shall be interpreted as illustrative and not in a limiting sense.

I claim:—

1. In an apparatus of the kind described, an enclosing casing having a light source and a photo-electric cell opposed to said light source, electrical indicating means actuated by the energy output of said photo-electric cell, a transverse supporting plate slidable through said casing between said light source and cell, said plate having apertured sockets selectively alignable in the path of light directed on said cell, cups having transparent bottoms receivable in said sockets and adapted to contain substances to be selectively interposed in said path of light, a transparent plunger enterable into the cup which is interposed in said path of light, and means for raising and lowering said plunger to vary the effective light traversed mass of substance in said interposed cup, said latter means having a visible means to indicate depth variations.

2. In an apparatus of the kind described, an enclosing casing having a light source and a photo-electric cell opposed to said light source, electrical indicating means actuated by the energy output of said photo-electric cell, a transverse supporting plate slidable through said casing between said light source and cell, said plate having apertured sockets selectively alignable in the path of light directed on said cell, cups having transparent bottoms receivable in said sockets and adapted to contain substances to be selectively interposed in said path of light, a transparent plunger enterable into the cup which is interposed in said path of light, means for raising and lowering said plunger to vary the effective light traversed mass of substance in said interposed cup, said latter means having a visible means to indicate depth variations, and light modifying means having an adjustable aperture forming means between said light source and the interposed substance-containing cup, said latter means having a visible means to indicate the degrees of light modification effected thereby.

3. In an apparatus of the kind described, an enclosing casing having a light source and a photo-electric cell arranged in opposition to said light source, electrical indicating means actuated by the energy output of said photo-electric cell, a cup having a transparent bottom and arranged to interpose substances to be examined between said light source and said photo-electric cell and subject to traverse therethrough of light from said light source to said cell, a transparent plunger movable into said cup, means for moving said plunger to vary the effective light traversed mass of the substance in said cup, said latter means having a visible means to indicate depth variations, and light modifying means interposed between said light source and said substance-containing cup, said light modifying means comprising relatively movable shutter plates providing an adjustable light transmitting aperture therebetween, means for actuating said shutter plates, to increase or decrease said light aperture at will, and an indicating member connected to one of said shutter plates for giving visual indication of the size of the light transmitting aperture.

WILLIAM G. EXTON.